UNITED STATES PATENT OFFICE.

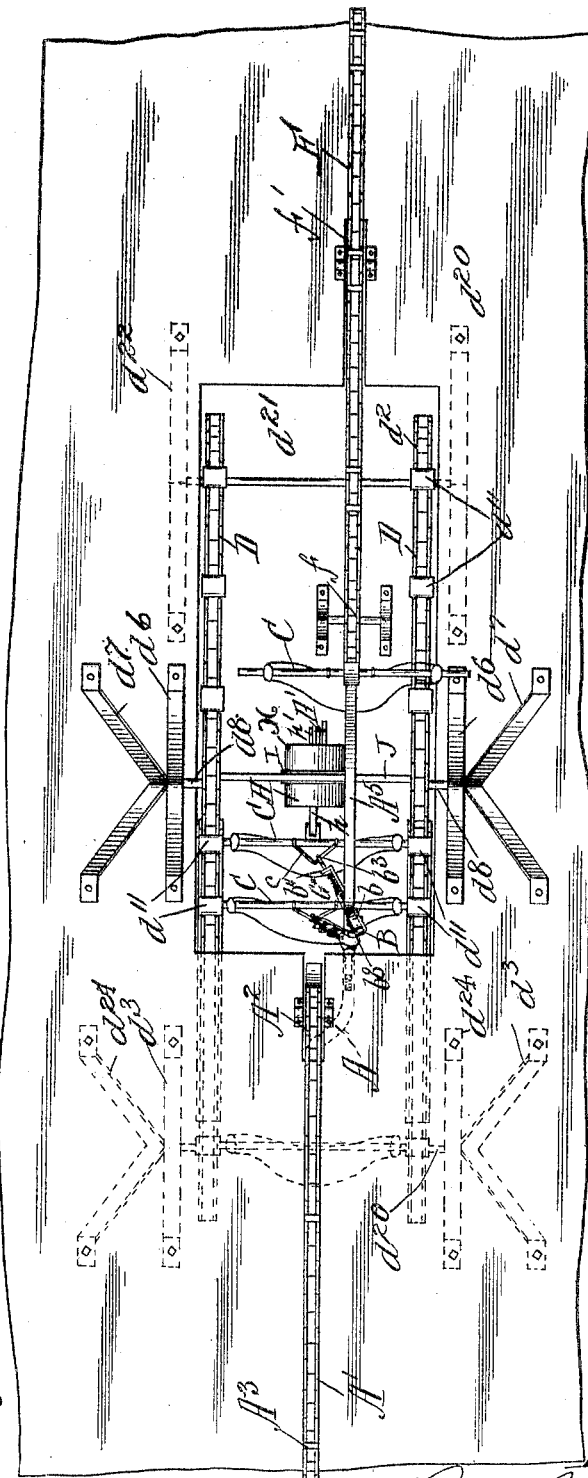

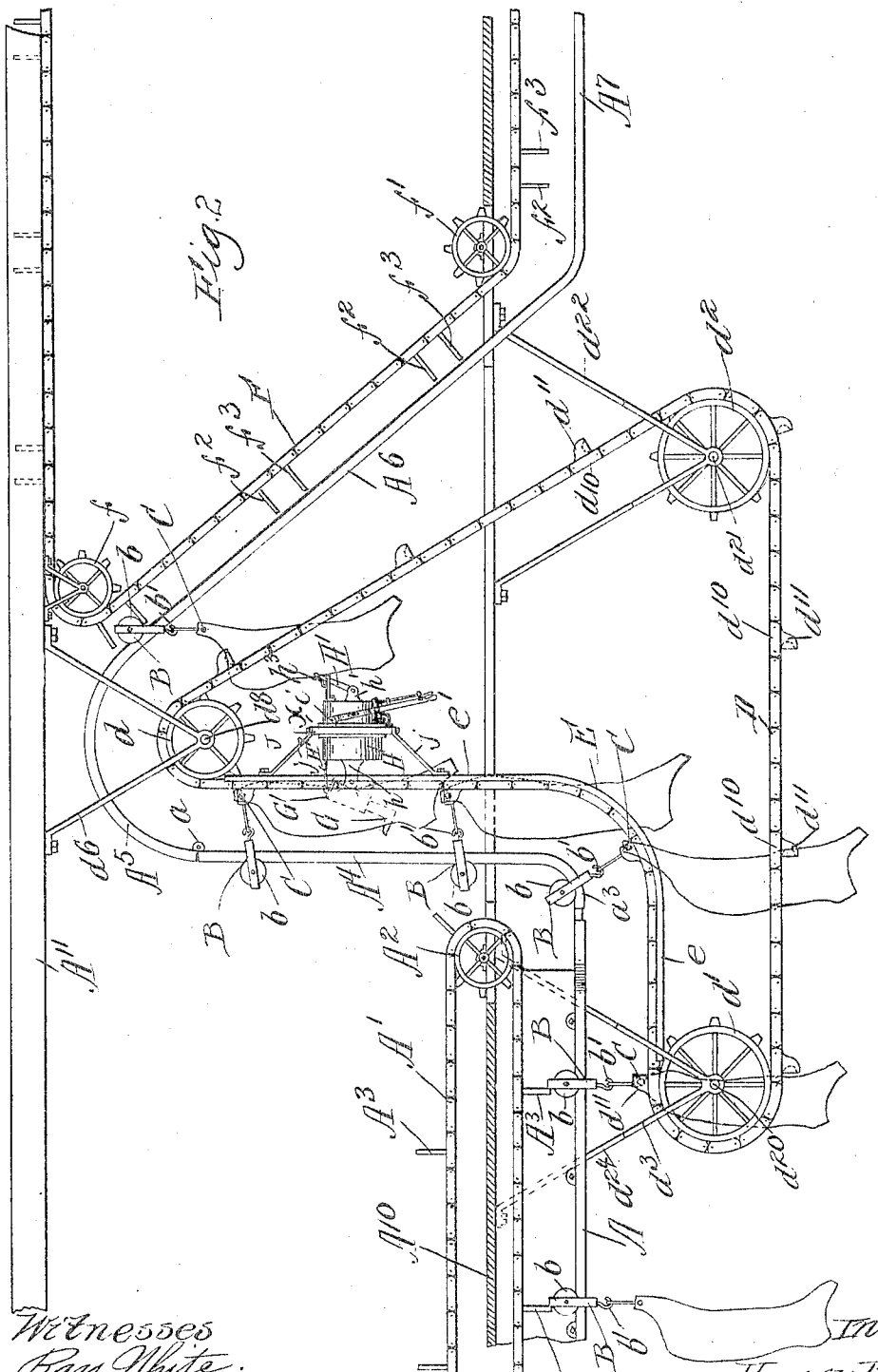

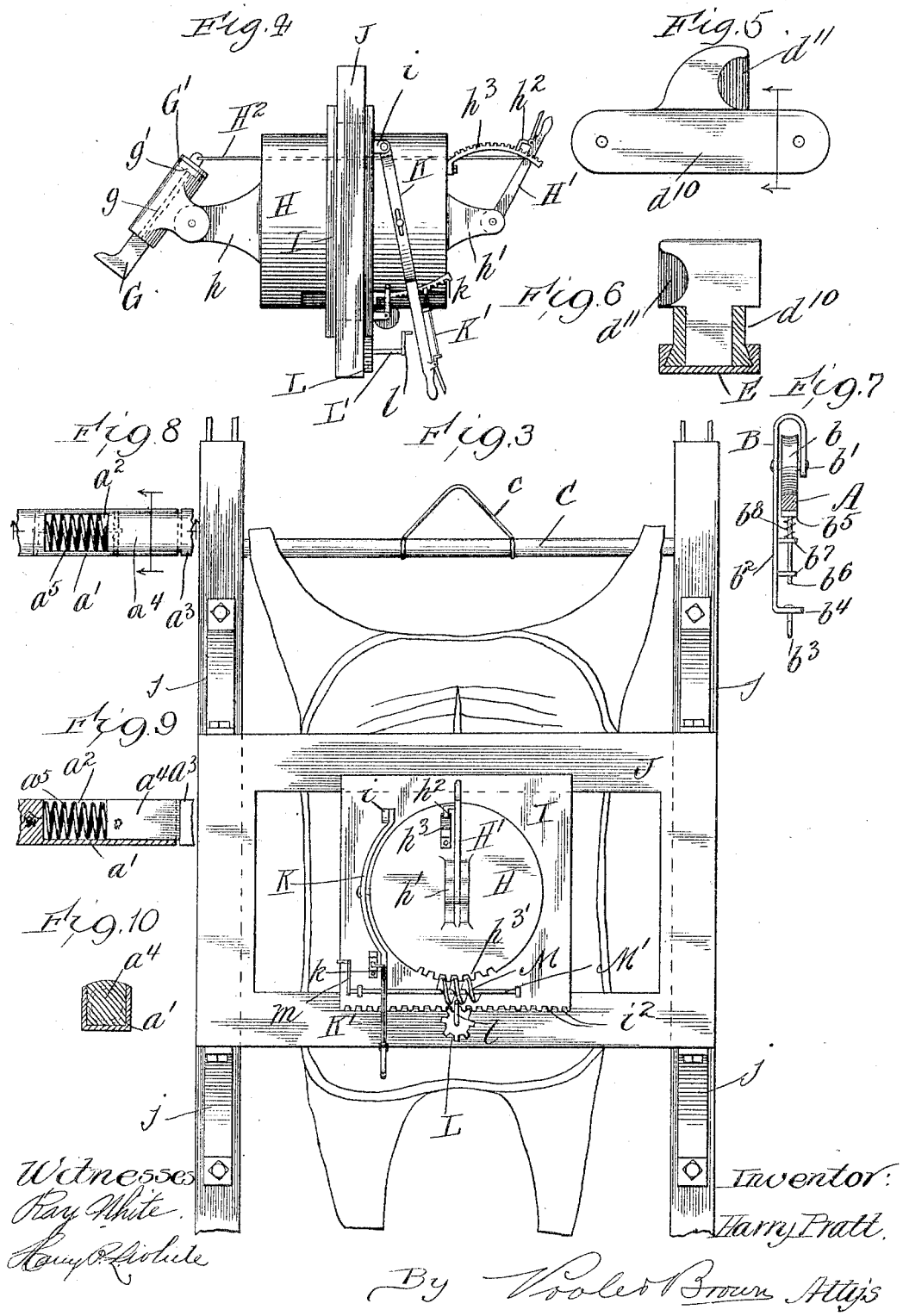

HARRY PRATT, OF KENILWORTH, ILLINOIS.

APPARATUS FOR DIVIDING THE CARCASSES OF HOGS AND OTHER ANIMALS.

No. 797,220.  Specification of Letters Patent.  Patented Aug. 15, 1905.

Application filed May 12, 1904. Serial No. 207,601.

*To all whom it may concern:*

Be it known that I, HARRY PRATT, a citizen of the United States, and a resident of Kenilworth, in the county of Cook and State of Illinois, have invented certain new and useful Improvements in Apparatus for Dividing the Carcasses of Hogs and other Animals; and I do hereby declare that the following is a full, clear, and exact description thereof, reference being had to the accompanying drawings, and to the letters of reference marked thereon, which form a part of this specification.

This invention relates to an apparatus for cutting or dividing into two parts or halves the carcasses of hogs, sheep, and like animals during the process of butchering; and the invention consists in the matters hereinafter set forth, and more particularly pointed out in the appended claims.

An apparatus embodying my invention embraces, in general terms, in combination with the usual continuous-traveling trolley apparatus for carrying the carcasses of the animals from place to place in the slaughter-house, a supplemental conveyer, which receives the carcasses from the main conveyer of the trolley apparatus and carries the carcasses, while hanging vertically, upwardly past a stationary cutting mechanism provided with a suitable cutting-knife and which is located in such relation to the supplemental conveyer that the cutting-knife or cleaver acts upon the carcasses while the latter are passing through the vertical part of said conveyer. The partially-divided carcasses are thereafter disposed of in any other suitable manner—as, for instance, a third or discharging conveyer may be employed to receive the same from the supplemental conveyer. As herein shown the apparatus is so organized that the carcasses travel from the beginning to the end of their route over a continuous track while suspended from suitable hangers. The said track constitutes in some parts thereof the support for the carcasses, while in other parts it constitutes merely a guide for the hangers by which the carcasses are suspended.

In the drawings, Figure 1 is a plan view of an apparatus embodying my invention. Fig. 2 is a side elevation thereof. Fig. 3 is a rear elevation of the cutting mechanism and associated parts. Fig. 4 is a side elevation of the cutting-knife and its carrier removed from the other parts. Fig. 5 is a side elevation of one of the hooks of the supplemental conveyer which engages the gambrel-sticks upon which carcasses are suspended in a manner to support the same. Fig. 6 is a cross-section taken on line 6 6 of Fig. 5. Fig. 7 is a detail of one of the carcass-hangers. Figs. 8, 9, and 10 illustrate a yielding construction in the guiding and supporting track, whereby it automatically conforms to the supplemental conveyer, Fig. 9 being taken on line 9 9 of Fig. 8 and Fig. 10 being taken on line 10 10 of Fig. 8.

As shown in the drawings, A designates a horizontal track, and B B designate a plurality of hangers having wheels $b$, which rest and roll on the track. Said hangers are provided at their lower ends with hooks $b^3$, which engage loops or bails $c$, affixed to the gambrel-sticks C, by which the carcasses are suspended. Said carcasses thus suspended are carried forwardly on the track A by means of an endless conveyer A', which is trained about suitable pulleys $A^2$ (one of which is shown) and provided with arms $A^3$, which are adapted to engage the hangers B in a manner to carry the same forwardly. Said trolley device is supported from the ceiling $A^{10}$ of the room containing the apparatus, and, as herein shown, the upper lap of the conveyer is located above the ceiling.

D D designate the two endless chains or belts of a supplemental conveyer, which are trained about upper and lower pairs of sprocket-pulleys $d\ d'\ d^2$. Said supplemental conveyer extends upwardly through a suitable opening in the ceiling $A^{10}$ and is located partly in a lower and partly in an upper room. The pairs of sprocket-pulleys $d'\ d^2$ are located in substantial horizontal alinement with each other. The sprocket-wheels $d'$ are rotatively mounted on short shafts $d^{20}$, that are supported in laterally-separated brackets $d^{21}$, depending from the ceiling $A^{10}$. Two short shafts are employed to permit the carcasses to pass between said pulleys, as will hereinafter appear. The brackets $d^2$ are braced by other brackets $d^3$, Fig. 1. The sprockets $d^2$ are mounted on a continuous shaft $d^{21}$, that extends between and is mounted in the lower ends of brackets $d^{22}$, depending from the ceiling $A^{20}$. The stub-shafts $d^8$ of the upper sprocket-pulleys $d$ are mounted in the lower ends of brackets $d^6$, which are braced by brackets $d^7$, said parts being made like the brackets $d^{21}\ d^3$ and attached to the ceiling $A^{11}$ of the upper room, as shown in Fig. 2.

Those parts of the pair of belts or chains D D of the supplemental conveyer between the pulleys $d'\ d$ are partially horizontal and partly vertical, while the parts between the pulleys $d$ and $d^2$ are shown as downwardly inclined, and the parts between the pulleys $d^2$ and $d'$ are horizontal. The disposition of the latter two parts of the conveyer is not important. The short horizontal portions of the conveyer above the pulley $d'$ travel beneath and parallel with the track A and from thence travel vertically to the upper sprocket-pulleys $d$, and while being carried upwardly by said vertical parts of the conveyer the carcasses are carried past a cutting mechanism, (designated as a whole by the letter X in Figs. 1 and 2 and shown in detail in Figs. 3 and 4.) The said horizontal and vertical parts of the supplemental conveyers are joined by curved parts and are guided in suitable guides E, consisting of horizontal and vertical parts $e\ e'$. The said guides E are provided with dovetail grooves, and the links $d^{10}$, constituting the supplemental conveyers, are shaped to interfit with said guide, as shown in Fig. 6, thereby preventing the links being laterally disengaged from the guides.

The track A is continued vertically to constitute a vertical part $A^4$, which is located between and parallel with the vertical parts of the supplemental conveyer, and a curved part $A^5$, which is curved above the upper sprocket-pulley $d$. From thence said track is directed obliquely downwardly to constitute an inclined portion $A^6$ and thence horizontally beneath the ceiling $A^{10}$ to constitute a horizontal track to direct the carcasses away from the cutting mechanism. It will thus be seen that the track engaged by traveling hangers B and comprising the horizontal end parts A $A^7$ and intermediate vertical and inclined parts $A^4\ A^6$, connected by the curved part $A^5$, extends continuously from one end of the organized apparatus to the other. As will hereinafter appear, the horizontal and inclined parts of the tracks constitute supports for the traveling carcasses, while the vertical and curved parts constitute guides for the hangers to maintain the hangers engaged with the tracks while the weight is taken by the conveyers.

The endless chains D D of the supplemental conveyer are provided with oppositely-located carrying-hooks $d^{11}$, (shown more clearly in Figs. 2, 5, and 6,) which, as herein shown, are formed integral with certain of the links $d^{10}$ of the chains of the supplemental conveyers. Said hooks open forwardly with respect to the direction of travel of the conveyer-chains. In the short horizontal part of the supplemental conveyer beneath and parallel with the horizontal part of the track A, as shown in Fig. 1, the said hooks $d^{11}$ are located in the horizontal plane of the ends of the gambrel-sticks C, and said sticks project from the hocks of the legs of the carcasses a sufficient distance (in a familiar manner) to become engaged with said hooks. With this construction and arrangement the hooks $d^{11}$ engage the extended ends of the gambrel-sticks while the carcass is supported on the horizontal part of the track A, after which the carcasses are advanced or carried forwardly by the supplemental conveyer. The arrangement whereby the hooks $d^{11}$ engage with the gambrel-sticks while the carcasses are supported on the track A constitutes a transferring mechanism whereby the carcasses are transferred from the main conveyer to the horizontal conveyer, and so far as the broader aspects of my invention are concerned such transfer mechanism may be otherwise constructed. While the carcasses are being carried upwardly by the vertical part of the supplemental conveyer and around the pulleys $d$ the hangers are engaged with the vertical and curved parts $A^4\ A^5$ of the track, said parts of the track holding the hangers in proper position to again support the carcasses after they have passed the upper curved parts of the supplemental conveyer. After the carcasses have passed the cutting mechanism and have been carried over the pulleys $d$ of the supplemental conveyer they are directed downwardly over the inclined and horizontal parts $A^6\ A^7$ of the track by means of an endless discharge-conveyer consisting of a single chain or belt F, trained over pulleys $f\ f'$, (two of which are shown.) Between the pulleys $f$ and $f'$ the conveyer travels parallel with and above the inclined part of the track $A^6$, and beyond the pulley $f'$ travels parallel with and above the horizontal portion $A^7$ of the track. Said conveyer is provided at suitable intervals with a number of pairs of coacting arms $f^2\ f^3$, extending at right angles to the conveyer. Said arms are so spaced on the conveyer F and the conveyer so timed with respect to the supplemental conveyer that as each hanger (supporting a carcass) passes the curved part $A^5$ of the track and is entering on the inclined part $A^6$ thereof the wheel of said hanger enters between one pair of arms $f^2\ f^3$. The advance arm of each pair acts to hold or restrain the weight of the carcass while the carcass is traveling down said incline, the carcass traveling only as fast as the discharge-conveyer is traveling. After said carcass has reached the horizontal part $A^7$ of the track it is advanced or carried forwardly thereon by contact of the rear arm $f^2$ with the trolley-hanger.

In order that there shall be no binding of the hangers as they pass from the horizontal part A to the vertical part $A^4$ of the track and in order also to prevent the hooks of the hangers from becoming disengaged from the bails of the gambrel-sticks, the lower end of said vertical part of the track is shown as made yielding by means tending to cause it to spring away from the vertical parts of the supplemental conveyer, while permitting it to yield toward said conveyer.

The construction whereby the track yields in the manner described is made as follows: The vertical part A⁴ of the track is connected with the curved part A⁵ thereof by a hinge $a$, Fig. 2, and is connected at its lower end with the horizontal part A of the track by a spring-joint which permits said lower end of the part A⁴ of the track to yield toward the vertical parts of the supplemental conveyer. A convenient form of spring-joint is shown in Figs. 8 to 10, inclusive, and is made as follows: The end $a'$ of the horizontal portion A of the track is provided with a socket $a^2$, which is open at its upper side, and the lower laterally-turned part $a^3$ of the vertical portion A⁴ of the track is provided with a reduced guide extension $a^4$, which enters and slides endwise in said socket. Said parts are drawn together by means of a spiral contractile spring $a^5$, it being attached to the end of the guide projection $a^4$ and to the bottom of the socket in any suitable manner. If, therefore, by reason of slight inaccuracies in making or assembling the apparatus the track should not be parallel or otherwise properly related to the supplemental conveyer, but tends through endwise pull on the hanger to bind the moving parts or to loosen the endwise stress on the hangers in a manner tending to disengage the hook of the hanger with the bail or loop of the gambrel-stick, the vertical part of the track will yield sufficiently in either direction to counteract such tendency.

The hangers are constructed to closely grip the track at a time when said track serves merely as a guide for said hanger. The construction of the hangers is shown in Fig. 7 and is made as follows: The wheel $b$ of each hanger is rotatively mounted on a short transverse pin $b'$, that extends between the yoke-arms at one end of the shank $b^2$ of said hanger. The hooks $b^3$, by which the hanger-shanks are attached to the bails of the gambrel-sticks, are attached to laterally-turned ends $b^4$ of said shanks. The wheels are pressed in close engagement with the track by means of spring-pressed shoes $b^5$, attached to the ends of endwise-movable rods $b^6$, which slide in guide-openings in lugs $b^7$ on the shanks of the hanger. The shoe of each hanger is pressed against said track by means of a spring $b^8$, interposed between one of the lugs and said shoe.

The cutting mechanism, which is designated in Figs. 1 and 2 as a whole by the reference-letter X and is shown in detail in Figs. 3 and 4, is made generally like the cutting mechanism shown in my pending application for United States Letters Patent, Serial No. 206,372, filed on the 4th day of May, 1904. The cutter consists, as shown in Fig. 4, of a reciprocating knife G, attached to one end of the rod $g$ of a piston $g'$, which reciprocates in a cylinder G', which may be the cylinder of a pneumatic or steam engine. Said cylinder G' is pivotally supported on a lug $h$, extending forwardly from the forward end of a cylindric carrier H, which latter is mounted in a suitable laterally-adjustable carriage I, that is supported in a frame J. Said frame J is immovably fixed to the vertical parts of the guides E for the supplemental conveyers by means of brackets $j$. The cylinder G', is adapted to be adjusted on its pivotal support to change the angle of the knife to the carcass by means of a lever H', Figs. 3 and 4, which is pivoted to a stud $h'$, extending rearwardly from said carrier H and connected at its upper end with the upper end of the cylinder G' by a connecting-rod H², that extends through an opening in said cylindric carrier H. Said lever H' is provided with a pawl $h^2$, which engages a segmental rack $h^3$, attached to the cylindric carrier H, whereby the lever and cylinder are locked in an adjusted position. Said carrier H is adapted to be adjusted toward and from the cutter by means of a lever K, which is pivoted at its upper end to a lug $i$ on the carriage I and has slotted connection between its ends with said carrier and is provided at its lower end with a spring-pressed latch or pawl K', that engages a segmental locking-rack $k$, affixed to the carriage I, whereby the carrier H is locked in any adjusted position as desired. The carriage is adjusted laterally in the frame J by means of a rotating pinion L, that is affixed to a shaft L', provided with a crank $l$, by which the pinion is turned, and said pinion engages a rack $i^2$ on a lower edge of the carriage I. The cylindric carrier H is also adapted to be rotated on its axis by means of a worm M, formed on a rotative shaft M', that has bearing in suitable lugs on the carrier I, and said worm meshes with suitable gear-teeth $h^3$ on the lower periphery of the cylindric carrier. The shaft M' is provided with a crank $m$, by which it is turned. These various adjusting devices are similar to the adjusting devices shown in the cutting mechanism of my prior application and are for the purpose of adjusting the cutting-knife to carcasses which may be presented to the cutting mechanism out of accurate cutting relation thereto.

The operation of my apparatus will be understood from the foregoing, it being understood that the carcasses are continuously delivered by the main horizontal conveying mechanism to the supplemental conveying mechanism and is by the latter carried vertically past the cutting mechanism and partially severed or divided and are thereafter discharged from the apparatus by the discharging conveyer. It will be noted from inspection of Fig. 1 of the drawings that the track A is offset at the base of the vertical part A⁴ thereof, such offset being provided to bring the track out of line with the cutting-knife, and thereby prevent the knife coming in contact with the track.

It is obvious that many of the structural details of my invention may be varied without departing from the spirit of my invention, and I do not wish to be limited thereto, except as hereinafter made the subject of specific claims.

I claim as my invention—

1. In a machine for the purpose set forth, the combination with a vertically movable conveyer comprising two parallel conveyer-belts provided with a plurality of pairs of hooks adapted to receive the ends of the gambrel-sticks by which the carcasses are suspended, of a stationary cutting mechanism located adjacent to said conveyer, said conveyer carrying the carcass vertically past the cutting mechanism whereby it is cut or severed while being carried by said conveyer past the cutting mechanism, and horizontal conveyers for delivering the carcasses to and receiving them from the vertical conveyer.

2. An apparatus for the purpose set forth comprising, in combination with a main horizontal conveyer for the carcasses, gambrel-sticks supported on and advanced by said horizontal conveyer, an upright supplemental conveyer embracing two parallel conveyer-belts provided with hooks or the like adapted to receive the ends of the gambrel-sticks, said hooks of the supplemental conveyer automatically receiving the ends of the gambrel-sticks whereby the carcasses are transferred to the supplemental conveyer, and a stationary cutting mechanism adjacent to the upright parts of the supplemental conveyer and operating to cut or divide the carcasses as they are carried upwardly by said upright parts of the supplemental conveyer past said cutting mechanism.

3. An apparatus for the purpose set forth comprising, in combination with a main horizontal, continuously-movable conveyer, its track and hangers traveling on said track from which carcasses are suspended, a supplemental conveyer comprising two endless, laterally-separated parallel belts which travel vertically for a portion of their lengths, said track being continued upwardly parallel with the vertical portion of said supplemental conveyer, means on the supplemental conveyer for receiving the carcasses whereby they are carried upwardly by the vertical part of said supplemental conveyer, and a stationary cutting mechanism located adjacent to said vertical part of the conveyer for cutting the carcasses as they are carried upwardly past the same.

4. An apparatus for the purpose set forth comprising, in combination with a horizontal continuously-movable conveyer, its horizontal track, hangers traveling on said track, each adapted to support a gambrel-stick, a supplemental conveyer comprising two parallel conveyer-belts which travel vertically in a portion of their length, said track being continued upwardly parallel with the vertical portion of said supplemental conveyer, means on the supplemental conveyer for engaging at the lower end of the vertically-traveling part thereof a gambrel-stick whereby carcasses are transferred to and carried upwardly by the vertically-movable part of said supplemental conveyer, and a stationary cutting mechanism located adjacent to said vertical part of the conveyer for cutting the carcasses as they are carried upwardly past the same, said vertical continuation of the track being yieldingly connected with the horizontal part of the track.

5. An apparatus for the purpose set forth comprising, in combination with a horizontal, continuously-movable conveyer its horizontal track, hangers traveling on said track, each adapted to support a gambrel-stick, a supplemental conveyer comprising two parallel conveyer-belts, a portion of which travels vertically, said track being continued upwardly parallel with the vertical portion of said supplemental conveyer, means on the supplemental conveyer for engaging at the lower end of the vertically-traveling part thereof for a gambrel-stick, whereby the carcasses are transferred to and carried upwardly by the vertical part of said supplemental conveyer, and a stationary cutting mechanism located adjacent to the vertically-traveling part of the conveyer for cutting the carcasses as they are carried upwardly past the same, said vertical continuation of the track being hinged at its upper end and being connected at its lower end with the horizontal part of the track by a yielding joint permitting it to be yieldingly moved toward the supplemental conveyer.

6. An apparatus for the purpose set forth comprising, in combination with a continuously-movable, horizontal conveyer, its track, a plurality of hangers moving on said track, each adapted to support a gambrel-stick, a supplemental conveyer comprising parallel endless belts, a portion of which travel horizontally parallel with said track, and a portion of which travel vertically, said track being provided with a vertical extension parallel with the vertical part of said supplemental conveyer, and oppositely-located hooks on the said conveyer-belts adapted to engage the ends of a gambrel-stick projecting from a carcass for transferring the same from said horizontal conveyer and track to the vertical part of the supplemental conveyer and suspending them on the latter and cutting mechanism adjacent to said vertical part of the conveyer for cutting the carcasses as they are carried upwardly past the same.

7. An apparatus for the purpose set forth comprising, in combination with a continuously-movable, horizontal conveyer, its track and a plurality of hangers moving on said track each adapted to support a gambrel-stick, a supplemental conveyer comprising parallel endless belts, a portion of which travels horizontally parallel with said track, and a portion of which travels vertically, said track being provided with a vertical extension parallel with the vertical part of said supplemental conveyer, means on the said conveyer-belts adapted to engage a gambrel-stick for transferring the carcasses from said horizontal conveyer and track to the vertical part of the supplemental conveyer and the vertical track, a cutting mechanism adjacent to the vertical part of said supplemental conveyer for cutting or dividing the carcasses as they are moved vertically past the same, a discharge-conveyer and means located at the upper end of the vertical part of the supplemental conveyer for transferring the carcasses from the upper part of said supplemental conveyer to the discharge-conveyer.

8. A machine for the purpose set forth comprising, in combination with a continuously-movable, main horizontal conveyer, its track, and a plurality of hangers each adapted to support a gambrel-stick, of a supplemental conveyer embracing a horizontal part which travels parallel with the horizontal conveyer, and a vertical traveling part, means for transferring the carcasses from the horizontal conveyer to the horizontal part of the supplemental conveyer, a stationary cutting mechanism located in position for cutting or dividing the carcasses as they are carried upwardly past the same by the vertically-moving part of the conveyer, and a discharge-conveyer for receiving the carcasses after they have passed the cutting mechanism, said track of the horizontal conveyer being provided with a vertical extension parallel with the vertical part of the supplemental conveyer and thence inclined downwardly parallel with the discharge-conveyer, thereby constituting a continuous track for the hangers as they pass through the apparatus.

9. A machine for the purpose set forth comprising, in combination with a continuously-movable, main horizontal conveyer, its track, and a plurality of hangers each adapted to support a gambrel-stick, of a supplemental conveyer embracing a horizontal part which travels parallel with the horizontal conveyer, and a vertical traveling part, means for transferring the carcasses from the horizontal conveyer to the horizontal part of the supplemental conveyer, a stationary cutting mechanism located in position for cutting or dividing the carcasses as they are carried upwardly past the same by the vertically-moving part of the conveyer, and a discharge-conveyer for receiving the carcasses after they have passed the cutting mechanism, said track of the horizontal conveyer being provided with a vertical extension parallel with the vertical part of the supplemental conveyer and thence inclined downwardly parallel with the discharge-conveyer, thereby constituting a continuous track for the hangers of the carcasses passing through the apparatus, said discharge-conveyer having arms which engage the hangers while traveling on the inclined part of the track to retard the movement thereof.

In testimony that I claim the foregoing as my invention I affix my signature, in presence of two witnesses, this 7th day of May, A. D. 1904.

HARRY PRATT.

Witnesses:
   WILLIAM L. HALL,
   GERTRUDE BRYCE.